No. 634,288. Patented Oct. 3, 1899.
J. R. DUNCAN.
OIL BURNER.
(Application filed Jan. 18, 1899.)

(No Model.)

Witnesses
M. C. Buck.
R. O. Hawkins.

Inventor
John R. Duncan
By O. H. Lockwood
His Attorney.

THE NORRIS PETERS CO., PHOTO-LITHO., WASHINGTON, D. C.

UNITED STATES PATENT OFFICE.

JOHN R. DUNCAN, OF INDIANAPOLIS, INDIANA, ASSIGNOR TO SAMUEL V. PERROTT, OF SAME PLACE.

OIL-BURNER.

SPECIFICATION forming part of Letters Patent No. 634,288, dated October 3, 1899.

Application filed January 18, 1899. Serial No. 702,573. (No model.)

*To all whom it may concern:*

Be it known that I, JOHN R. DUNCAN, of Indianapolis, county of Marion, and State of Indiana, have invented a certain new and useful Oil-Burner; and I do hereby declare that the following is a full, clear, and exact description thereof, reference being had to the accompanying drawings, in which like figures refer to like parts.

This invention relates to a novel construction of an oil-burner that is simple and economical in operation as well as construction and is efficient by way of causing a high degree of volatilization of the oil and its admixture, whereby thorough combustion is secured.

The full nature of my invention will more fully appear from the accompanying drawings and the description and claims following.

Figure 1:
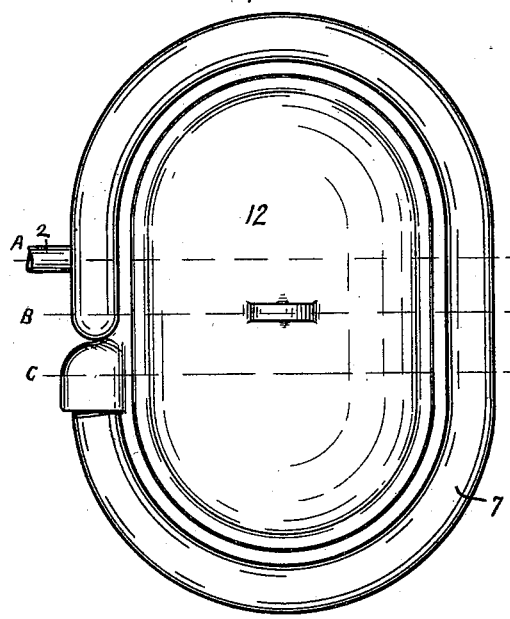
Figure 2:
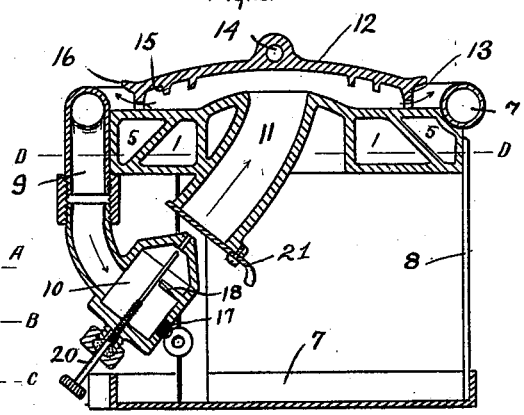
Figure 3:
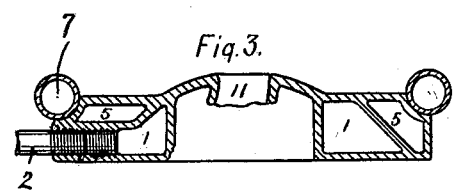
Figure 4:
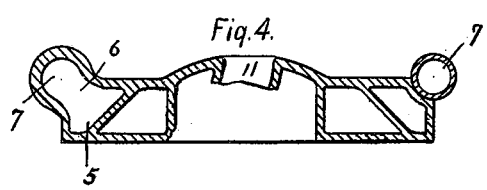
Figure 5:
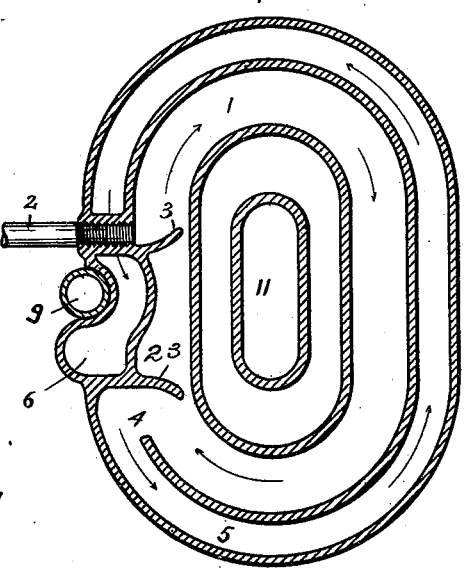

In the drawings, Figure 1 is a plan of my oil-burner. Fig. 2 is a vertical section on the line B B of Fig. 1. Fig. 3 is a vertical section of the upper portion on the line A A of Fig. 1. Fig. 4 is the same on the line C C of Fig. 1. Fig. 5 is a horizontal section on the line D D of Fig. 2.

In detail I provide an inner annular chamber 1, into which the oil is originally introduced through the supply-pipe 2. This annular chamber 1 has a deflecting-plate 3 (seen in Fig. 2) to direct the flow of oil in the chamber 1 in a certain direction, as shown. After making almost a circuit the oil or gas passes through the outlet-opening 4 into the annular chamber 5, that surrounds the chamber 1. At the outlet 4 there is another deflecting-plate 23 to direct the oil or gas through the said opening 4 into the said chamber 5. In the beginning of the operation or afterward volatilization is caused by placing oil in the oil-pan 7, it being preferably made of asbestos, and burning it so that the flame will heat the chamber 1. It is observed that the chamber 1 is so placed as to receive the direct heat from this flame—in fact, its bottom is made wide, as shown, in order to distribute the oil over it—and that more of the surface of the chamber will receive the heat from the flame. The oil-pan 7 is suspended and secured to the main part of the oil-burner by the bars 8. In this way the oil is heated and the initial heating and volatilization of the oil are effected, and afterward this result is obtained from the burner itself, as will be hereinafter explained.

The vapor passes through the annular chamber 5 in a reverse direction as compared to chamber 1, and after passing under the inlet opening or pipe, as seen in Fig. 5, it escapes through the outlet 6 into the annular chamber 7. This chamber 7 is substantially a part of the pipe formation, as shown. While the vapor is passing through this chamber it is superheated and highly volatilized by direct contact of the flame from the burner and from it passes through the pipe 9 and the chamber 10 into the mixing-chamber 11. The outlet of the chamber 10 is very small and is so placed as to register with the inlet-opening of the mixing-chamber 11. This small outlet of the chamber 10 is closed or opened by the valve 20. The damper 21 is used to close the inlet-opening of the chamber 11 until the burner is gotten under way, and then it is opened and the small outlet of the chamber 10 is opened. The vapor enters the mixing-chamber 10, as explained, where it is mixed with air and goes therefrom to the burner.

The burner consists of a lid-shaped casting 12, with a depending flange 13 about its periphery, that rests upon the upper wall of the chamber 5, as shown in Fig. 2. This depending flange 13 is perforated adjacent to its lower edge, so that the gas escapes through said perforations and immediately over the upper wall of the chamber 5. This casting is provided with a finger-piece 14 above and a series of depending ribs 15 below, as shown in Fig. 2. It is also provided with a somewhat horizontally-extending flange 16 beyond the depending flange 13.

It is observed that the chamber 7 is elevated, as seen in Fig. 2, above the upper walls of the other chambers, and especially above the upper wall of the chamber 5, so that the flame issuing from the burner will directly contact with said chamber 7. It is assisted in this by the flange 16, that tends to direct the flame horizontally against the wall of said chamber 7. This will cause the vapor in said chamber 7 to be highly volatilized; also, the flame from the burner to heat directly the chamber 5 and indirectly heat the chamber 1 and their contents. It is noticeable that in this burner the heat applied to the various chambers is in proportion to the vapors or volatilized form of the contents. Thus the heat applied to the chamber 1 is very slight and indirect, although sufficient. By reason of this the oil will not be burned, as is the trouble in many burners. In the chamber 5 while there may be some oil it will be at the bottom and the main contents will be vapor in the upper part, which is directly heated, and in the chamber 7 there is no oil, but all vapor, and it is provided with a high heat. This makes the action of the burner coincide with the natural transformation of the oil to the gas.

In the chamber 10 I provide an outlet in the lower part thereof for any impurities, dirt, &c., which is closed by the plug 17. These impurities are deposited by gravity as the vapor makes the sharp turn from pipe 9, and the deflecting-wall 18 assists in accomplishing this result.

What I claim as my invention, and desire to secure by Letters Patent, is—

1. An oil-burner including a retort formed of a series of annular chambers, means for introducing oil into said retort, a burner, said burner and the chambers of the retort being relatively so arranged as to progressively increase the heat applied to the oil from the inlet into the retort to the outlet therefrom, and means for conveying the vapor from the retort to the burner.

2. An oil-burner including a retort formed of a series of annular chambers, one provided with a relatively broad bottom, the next one with a relatively broad top, and the third higher than the other two, means for introducing oil into the chamber with the broad bottom, means below said chambers for initially heating them, a burner so formed as to deflect the flame directly against the upper walls of the outer chambers, and means for conveying the vapor from the last chamber in the series to the burner.

In witness whereof I have hereunto affixed my signature in the presence of the witnesses herein named.

JOHN R. DUNCAN.

Witnesses:
ROBT. D. HAWKINS,
AMANDAS N. GROUT.